3 Sheets. Sheet 1.

J. Fassler,
Making Harvester Guard Fingers.
No. 100,878. Patented March 15, 1870.

Witnesses
J. F. Beale
B. Kersting

Inventor:
Jerome Fassler
by his atty
R. D. Smith

3 Sheets, Sheet 2.

J. Fassler,
Making Harvester Guard Fingers.

N° 100,878. Patented March 15, 1870.

Witnesses.
J. F. Beale
B. Kersting.

Inventor.
Jerome Fassler
by his atty
R. D. Smith.

N. PETERS, PHOTO-LITHOGRAPHER, WASHINGTON, D. C.

3 Sheets, Sheet 3

J. Fassler,
Making Harvester Guard Fingers.

N°. 100,878.        Patented March 15. 1870.

Witnesses.
J. F. Beale
B. Kersting

Inventor:
Jerome Fassler

United States Patent Office.

JEROME FASSLER, OF SPRINGFIELD, OHIO.

Letters Patent No. 100,878, dated March 15, 1870.

IMPROVED MACHINE FOR MANUFACTURING HARVESTER-GUARD FINGERS.

The Schedule referred to in these Letters Patent and making part of the same

*To all whom it may concern·*

Be it known that I, JEROME FASSLER, of Springfield, in the county of Clark and State of Ohio, have invented a new and useful Improvement in the Manufacture of Harvester-Guard Fingers; and I do hereby declare the following to be a full, clear, and exact description of the same, refererence being had to the accompanying drawings, in which—

Figure 8:
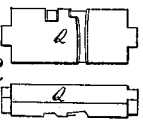
Figure 10:
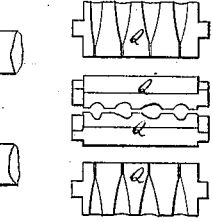
Figure 9:
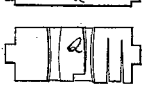

Figures 8 9 10 represent the dies detached.

Figure 11:
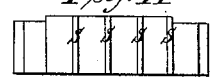
Figure 12:
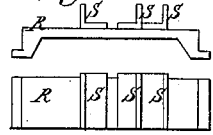

Figures 11 and 12 represent the guides detached.

Figure 13:
Figure 14:
Figure 1:
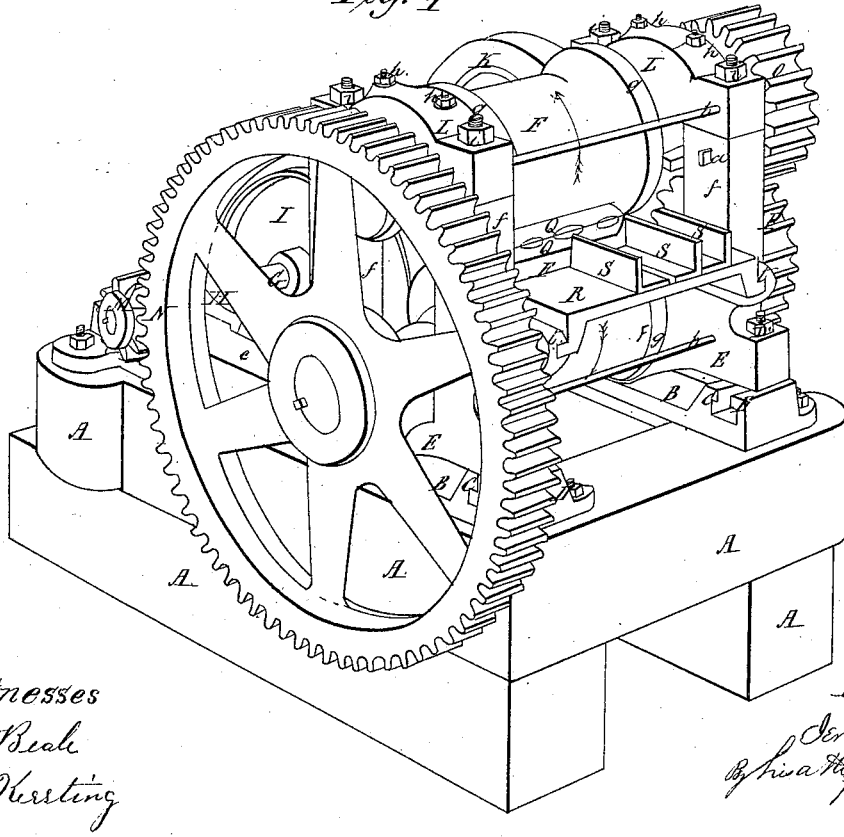
Figure 1 is a perspective view of my machine.
Figure 5:
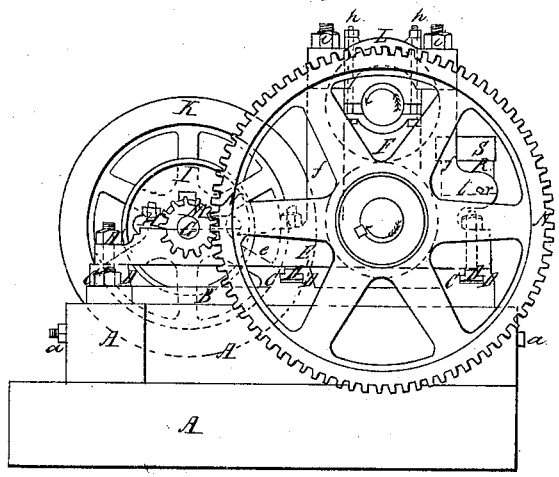
Figure 5 is a side elevation.
Figure 6:
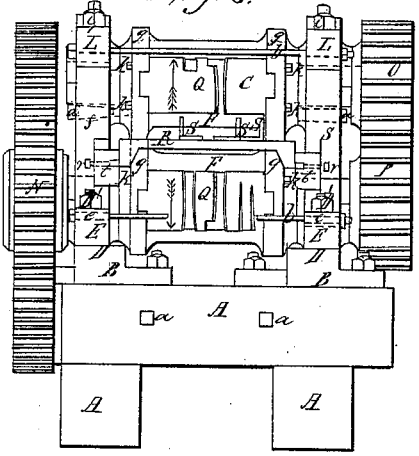
Figure 6 is an end elevation of the same.
Figure 4:
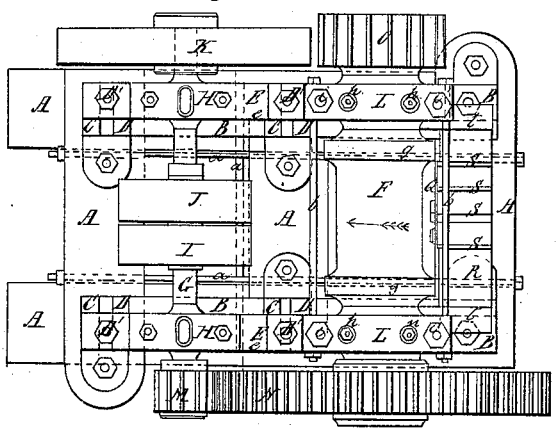
Figure 4 is a plan of my machine.

Figures 13 and 14 represent the holding-tongs.

Figures 15, 16, 17, and 18 represent blanks in different and successive stages of formation into guard-fingers.

Figure 19:
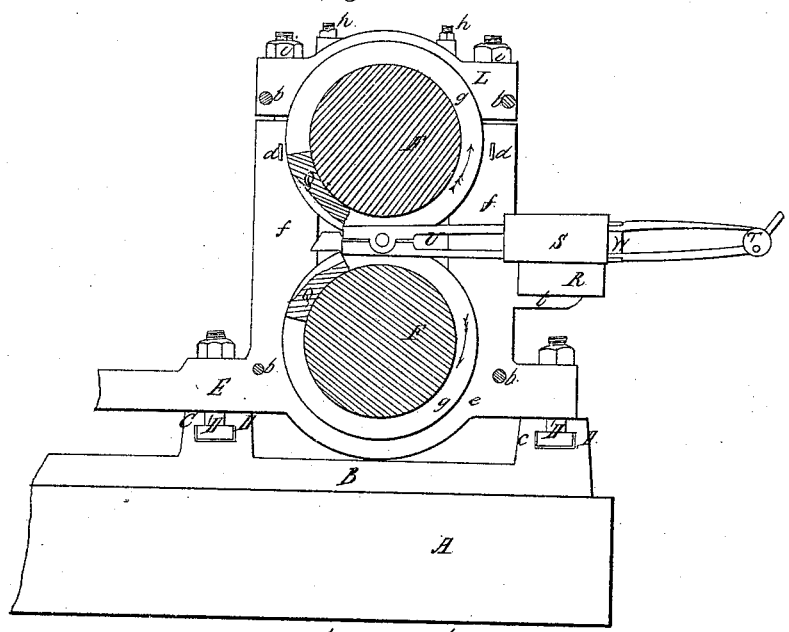

Figure 19 is a vertical longitudinal section showing the manner of presenting the blanks to the dies.

Figure 20:
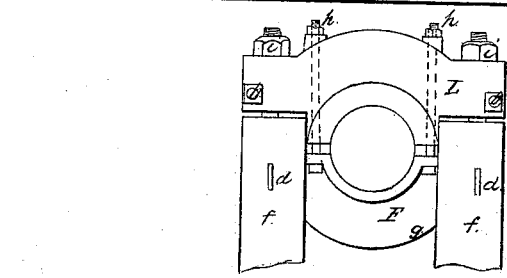

Figure 20 exhibits the manner of suspending the bearings of the upper roller.

My invention relates to an improvement in the manufacture of harvester-guard fingers; and It consists, first, in revolving dies constructed and arranged in a novel manner so that the blanks may be perfectly shaped without leaving the holding-tongs, as hereinafter set forth.

Hitherto, wrought guard-fingers for harvesters have been constructed by forging under the hammer or in swages; but it has been found to be impossible to procure perfect uniformity in size in that way, and I, therefore, propose to form them by means of revolving dies, thereby avoiding appreciable variations in size or form. As such dies have hitherto been constructed, however, it is necessary to employ two workmen, one to either side of the rollers, the one to return the blanks to the other, when the size thereof is so great that the proper formation cannot be secured by one passage through the die. In forming articles of the size of harvester-guard fingers, the delay necessary to enable the blanks to be passed back and grasped by his tongs, so as to properly present it to the dies a second or a third time, would involve the necessity of reheating, and greatly increase the percentage of defective work. To obviate these disadvantages of the ordinary revolving dies for these purposes I have devised the invention shown in application, whereby a single workman is enabled to conduct and complete the process of rolling the blank into form with only one reheating and once changing the grip of the tongs.

That others may fully understand the principle and construction of my invention I will particularly describe it.

The foundation A may be constructed of wooden timbers, or in any other convenient way. It is strengthened by the string bolts $a\ a$ inserted longitudinally and transversely, and secured by screw-nuts at the ends.

The iron bed-plates B B are securely bolted to the foundation A.

The bed-plates B B have upon their upper surfaces lugs, C D, so disposed in relation to each other as to form transverse ⊥-slots to receive the ⊥-heads of the bolts D', by which the frame-plates E of the machine are rigidly clamped to the bed-plate B.

This method of securing the frame to its bed permits perfect accuracy of arrangement and adjustment, as the bed-plates B may thus be made true and level and secured in place before the frames are set up, and these latter will then be level and capable of an easy adjustment to the lengths of bearing without any risk of cramping in the boxes.

The frame E consists of a horizontal bed, $e$, and two vertical standards, $f\ f$, between which are located the bearings of rollers F F.

The boxes H for the driving-shaft G are located upon the bed $e$, and are constructed in the usual manner.

Power is transmitted through driving-pulley I, and the ordinary loose pulley J serves to receive the belt when it is desired to stop the machine. A balance or fly-wheel, K, serves to relieve the motor from sudden resistance when the dies receive the blank. The string-bolts $h\ h$ inserted through $f\ f$ and caps L L secure the frame E from any lateral expansion.

The driving-shaft G has at one end, and outside of the frame, the driving-pinion M, and this gears with the large second wheel N, which is mounted upon the end of one of the bearings of the lower roller. The opposite ends of the rollers are geared by the spur-wheels O P.

The lower roller F has its bearings on the frame-bed $e$, between the standards $f$; and the upper roller F has its bearings suspended from the caps L L by the bolts $h\ h$, as shown in fig. 20. The cups L L are held in place by the bolts $i$, the butt ends of which are inserted into the tops of the standards $f\ f$, and are secured in their seats therein by transverse keys $d\ d$. Screw-nuts at the upper ends of the bolts $i\ i$, serve to regulate the distance between the faces of the rollers, as may be required.

The rollers F are formed with a flange, $g$, at each end, and the peripheries of these flanges are flush with the operative surfaces of the rollers, which I construct in separate pieces or dies, as shown at Q in the various figures, and in detached figs. 8, 9, and 10.

Figure 7:
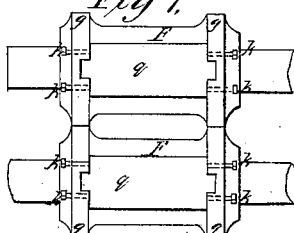
Figure 7 represents the rollers with dies detached.

Each roller F has a seat, $q$, provided on one side, for the reception of the die, (see fig. 7.) This seat is formed by making a part of the surface of the roller flat, and providing a recess or notch in the flange $g$ at each extremity of the seat, into which is received a corresponding projection on the end of the die. The die is thereby securely retained in place and prevented from twisting or otherwise moving in its seat. The set-screws $k\ k$ at each end of the die prevent it from dropping out of its seat as the roller revolves.

It will be observed that while the rollers are revolving there is a clear space between them; that is to say, between the flanges $g\ g$, excepting that portion occupied by the dies Q. This is clearly shown in fig. 7, and as the dies come together and then move toward the attendant, the blank must be thrust through said open space far enough to be caught by the advancing edges of the dies. As the blank must necessarily undergo compression between the dies, it must therefore be placed beyond the line which would connect the centers of the rollers a distance proportionate to the necessary amount of compression. This adjustment is easy of attainment, however, by employing proper guides and stops, and to this end I have attached a bridge, R, to the front standards $f\ f$. The lugs $t\ t$ are cast with said standards, and they are provided with a horizontal slot made to receive the ends of the bridge R, and the set-screws $i$ secure the bridge in place. The upper surface of the bridge is regulated so as to be about level with the line of contact between the dies, and it is provided with transverse flanges, S, which serve as guides to direct the tongs and blanks exactly to the proper die. These flanges are either made adjustable upon the bridge or separate bridges, and guides may be provided to accompany different sets of dies; and this I think is the preferable method, as possible errors of adjustment are thereby avoided.

The bridge may be adjusted in its seat so that a stop, W, placed upon the tongs, will, when in contact with the outer edge of the proper guide, designate exactly the proper distance to insert the blank, and this proper distance may be at a point where the advancing edges of the die will be sure to meet the ends of the tongs.

The tongs U, which I prefer to use, are shown in figs. 13 and 14. Their jaws are fashioned to fit the part of the blank which they are intended to grasp, and they are clamped conveniently by an eccentric block, T, pivoted to the extremity of the handles. This construction gives a double bearing to the joint and prevents twisting of the jaws.

Figure 2:
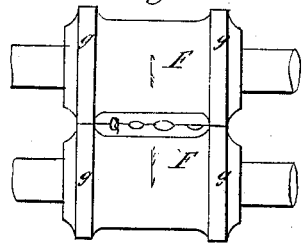
Figures 2 and 3 represent the dies in different positions.
Figure 3:
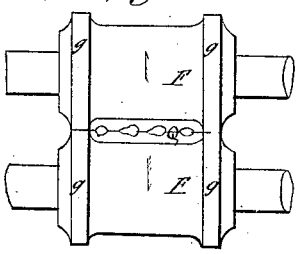
Figures 15, 16:
Figures 17, 18:

By my method one half of the finger is rolled at one operation and without being released from the tongs or reheated. The remaining half is then heated and the finger completed in another set of dies in a similar manner. Thus, the blank, fig. 15, is heated, at the small end and grasped by the large end, as shown in fig. 13. The proper dies having been previously placed on the rollers, the blank is then presented to the dies, as described and shown in fig. 19, and by several successive applications of the proper dies, the rear end of the finger is formed, as shown in figs. 16 and 17. This portion of the operation having been completed, the blank is passed to another machine having dies suitable to shape the point of the finger, or it is laid aside until such time as will be convenient to shift the dies. When the point is to be shaped, the blank, fig. 17, is grasped, as shown in fig. 14, and having been heated, is presented to the proper dies and completed in the same manner as the heel had been presented and completed. The finger will then have assumed its complete and proper form and will be ready to be submitted to the operations of smoothing, slotting, &c.

It is evident that the apparatus which I have described is applicable to the shaping, by revolving dies, of any article fabricated of malleable metal and of such comparatively small dimensions as to be handled with tongs.

Having now described my invention,

What I claim as new is—

1. The combination of the revolving dies Q, tongs U having the stops W, and the stationary guides S.

2. The holding tongs U, constructed with the stop W and eccentric block T, substantially as described.

3. The combination of the roller F, having a die-seat, as set forth, the die Q, and set-screws $k\ k$, substantially as described.

4. The bed-plates B, with lugs $c\ c$, or their equivalents, in combination with the main frame E, to secure an easy and perfect adjustment, as described.

JEROME FASSLER.

Witnesses:
 GEO. W. BEMIS,
 P. W. KELLY.